Sept. 20, 1966 R. M. PAGE 3,274,590
ANGLE TRACKING STORAGE RADAR SYSTEM
Filed Feb. 6, 1950 6 Sheets-Sheet 3
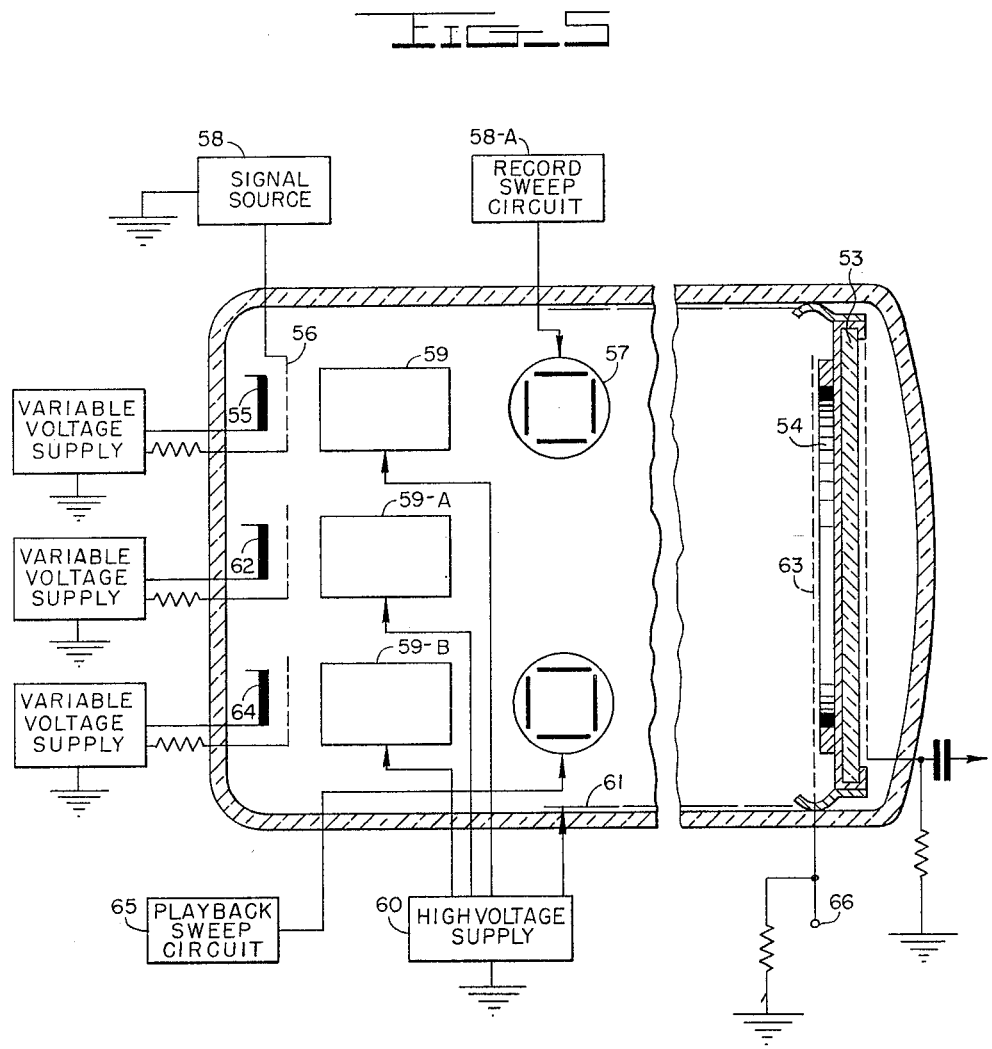
Inventor
ROBERT M. PAGE
By
ATTORNEY Sept. 20, 1966 R. M. PAGE 3,274,590
ANGLE TRACKING STORAGE RADAR SYSTEM
Filed Feb. 6, 1950 6 Sheets-Sheet 4
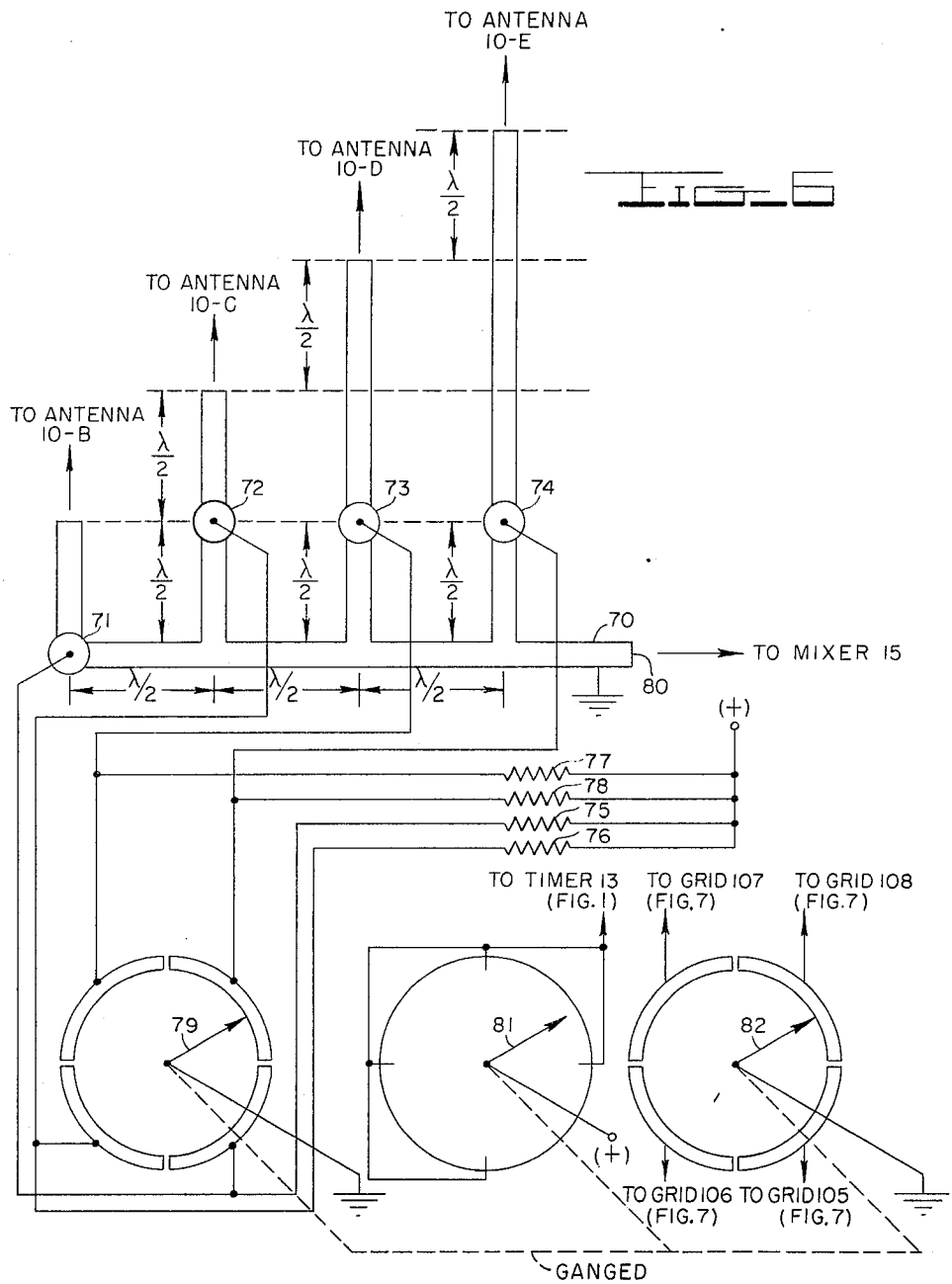
INVENTOR
ROBERT M. PAGE
BY
ATTORNEY Sept. 20, 1966  R. M. PAGE  3,274,590
ANGLE TRACKING STORAGE RADAR SYSTEM
Filed Feb. 6, 1950  6 Sheets-Sheet 5
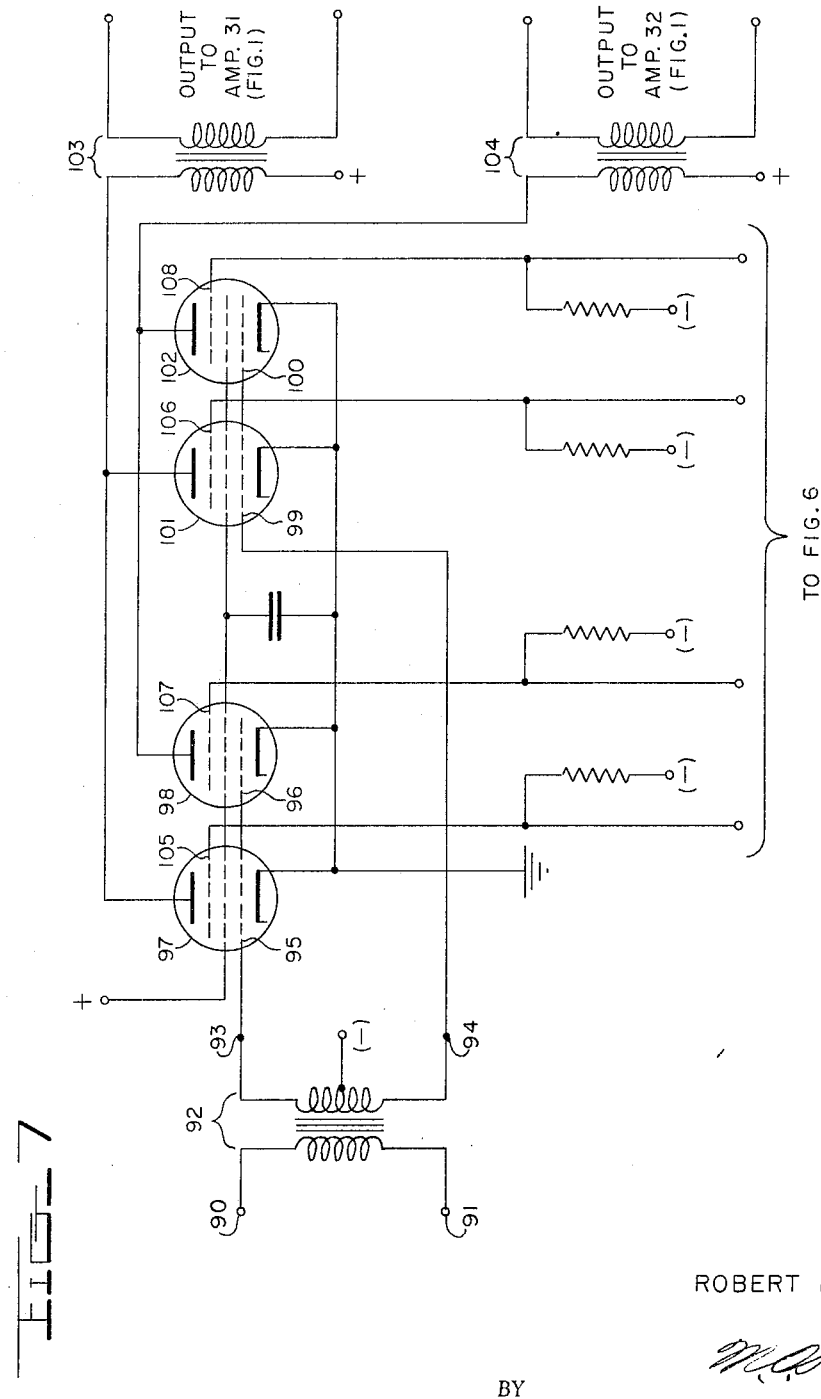
INVENTOR
ROBERT M. PAGE
BY
ATTORNEY

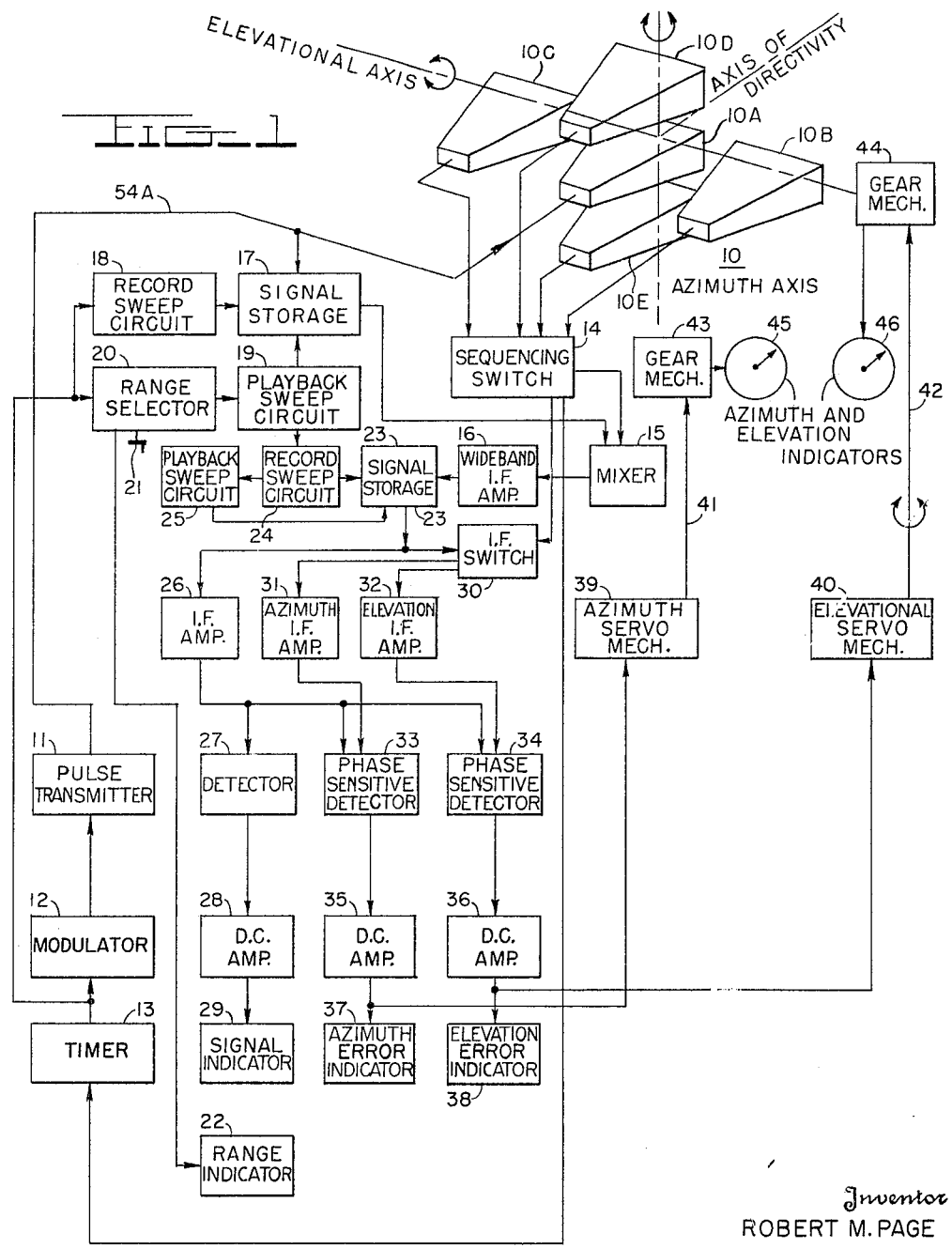

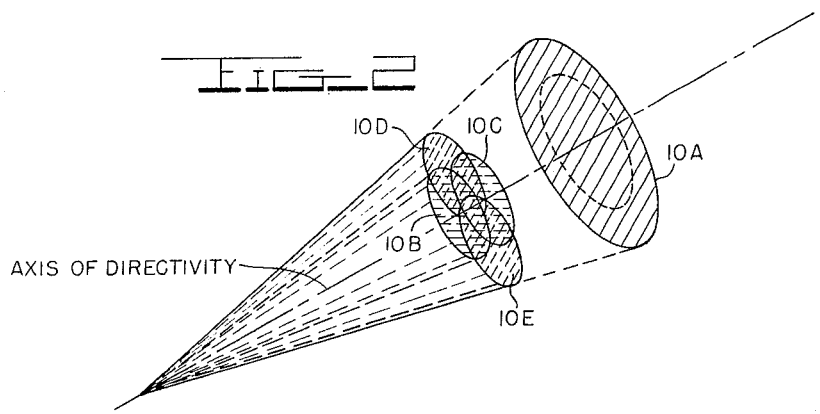
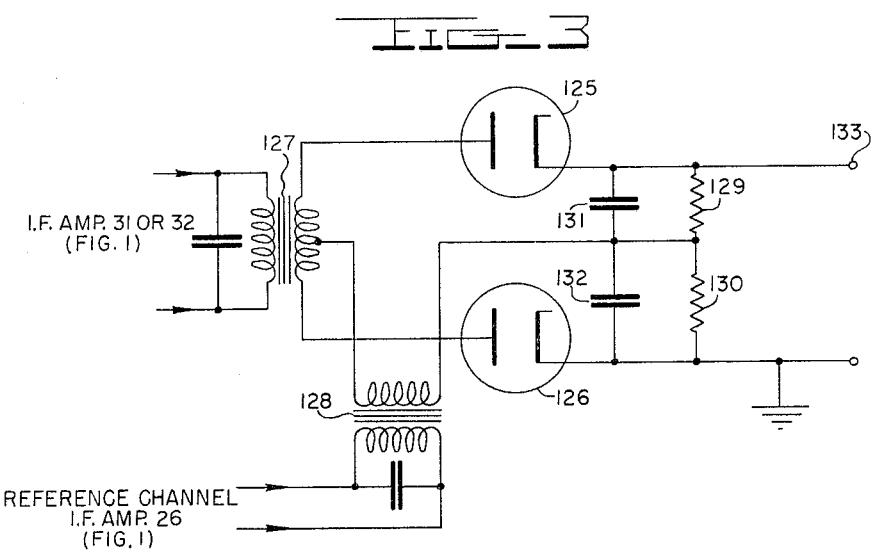
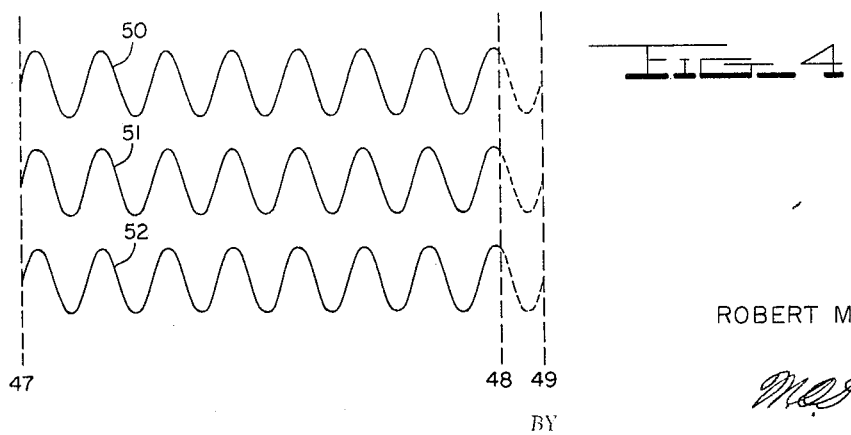

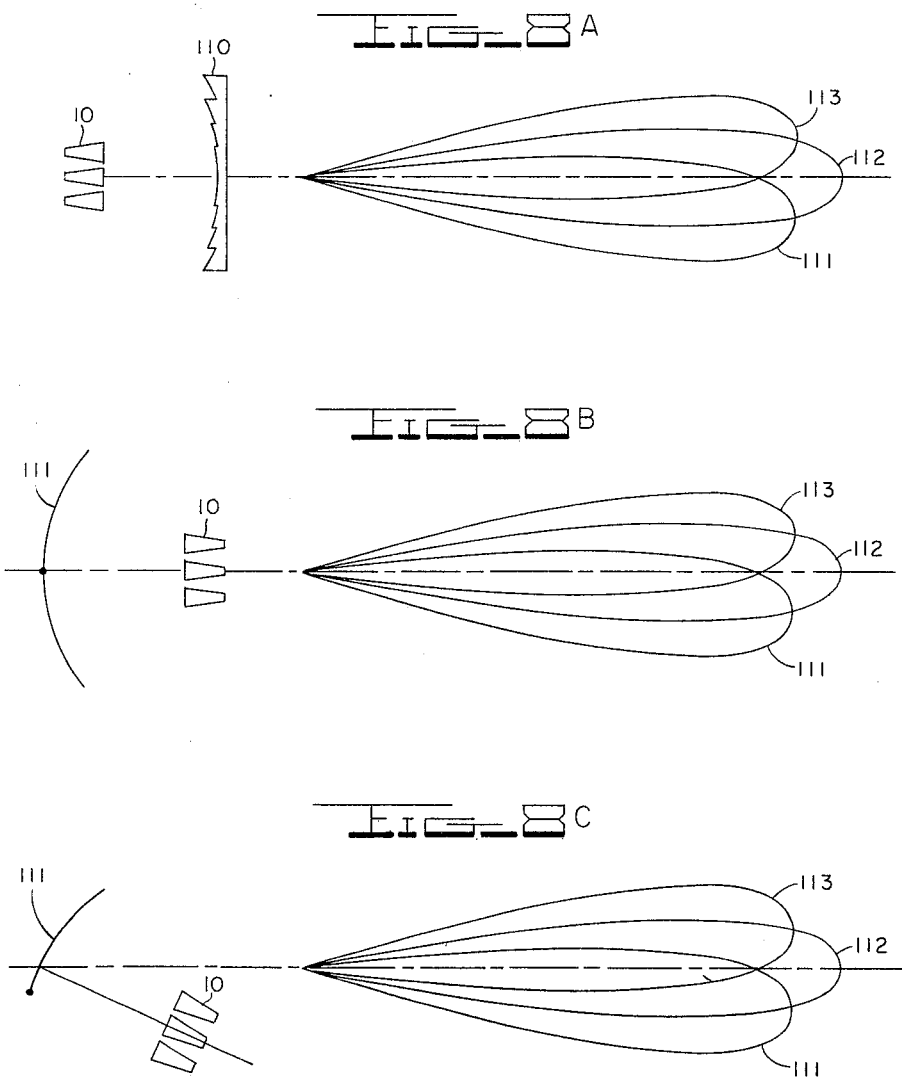

United States Patent Office 3,274,590
Patented Sept. 20, 1966

3,274,590
ANGLE TRACKING STORAGE RADAR SYSTEM
Robert M. Page, Camp Springs, Md.
(6715 Norview Court, Springfield, Va. 22150)
Filed Feb. 6, 1950, Ser. No. 142,681
8 Claims. (Cl. 343—7.4)

The invention described herein may be manufactured and used by or for the Government for governmental purposes without the payment of any royalty thereon.

This invention relates to impulse receiver systems in general and in particular to angle tracking devices for impulse operative locator systems such as sonar or radar having narrow bandwidth intermediate frequency amplifiers.

In my co-pending application Serial No. 135,215, filed December 27, 1949, entitled "Signal Integrating Radar System" there is described a radar system possessing numerous desirable features brought about as a result of a new form of operation in which received signals returned from successively emitted transmitter pulses are stored and played back in succession with a very minimum of time spacing therebetween. Such operation effectively lengthens received pulse signals to reduce the width of the frequency spectrum of the resultant signals at intermediate frequency. This reduction permits an improvement of the signal to noise ratio because the bandwidth of amplifiers ahead of the detector can be narrowed. Because the reduction of signal spectrum width at intermediate frequncy is accompanied by a loss of precision time occurrence data in the signal after detection, present forms of apparatus for precision angle tracking of an energy reflective object cannot be used.

The present invention contains certain apparatus which may be used in systems of the above mentioned signal integrating type to extend the usefulness thereof. In particular it is applicable to fire control radar systems in which a high degree of accuracy in angular tracking of a target (at long range) is desired. Angle tracking even at the extreme range of operation made possible by the foregoing integrating system is brought about in a typical two coordinate conventional system (elevation and azimuth) by intercepting reflected energy from four slightly divergent zones of reception, typically one right, and one left for one coordinate and one up and one down, for the second coordinate. Such controlled zone signal interception is familiar to all conversant with the angle tracking aspects of lobed fire control radar systems and may be brought about simply by transmitting energy pulses in a central zone and receiving reflected energy from four divergent, partly overlapping zones generally arranged symmetrically about the central zone. The signals obtained from opposing receiving zones (right-left and up-down) are compared and by their relative amplitudes it is possible to determine the position of a reflective object with respect to the central zone. In the past the amplitude comparison of signals in opposing zones has been made after the signals are reduced to a video or "rectified envelope" condition and for accurate angular measurement the identity of individual pulses must be retained after detection. It is therefore clear that where the integrating principles as taught by the above identified copending application are employed to their fullest extent so that the individual pulses are stored before detection and subsequently played back with time expansion to occupy substantially the entire time spacing between individual pulses, there is purposeful destruction of the identity of individual pulses of the return signals prohibiting the use of conventional angle comparison apparatus.

In accordance with the fundamental principles of the present invention, angle tracking apparatus is provided for a locator system, such as a radar set, employing signal storage and integration techniques.

Signal integration is employed in the angle tracking apparatus just as in the detection apparatus of the integrating radar to achieve the same improvement in signal to noise ratio.

Received signals as obtained from successive zones of reception are generally of a short duration and separated by relatively long periods of time. These signals are typically a first signal from the right zone, a second from the left, a third from up and a fourth from down, and are stored before detection and played back at a reduced frequency to occupy substantially the entire time between pulses. Signals from opposing zones (right-left) (up-down) of each coordinate are combined in opposition with a resultant of signal absence for a coordinate when the desired on-target signal equality condition occurs. When such cancellation is not complete, as when one zone of reception receives more signal from a certain reflective object than the opposing zone of reception because of the off center position of a reflective object, a resultant signal will build up in an amplitude dependent upon the differences between the opposing signal amplitudes and in a phase dependent on the sense of the displacement of the target relative to the axis of directivity. By independently measuring the resultant signals for each coordinate it then is possible to determine the position of a reflective object relative to the axis of directivity of the antenna system. Automatic follow-up is just one step further and may be accomplished through conventional servo systems suitable for operation at the small angles required for slow or fast moving targets at long ranges.

Accordingly, it is an object of the present invention to provide angle tracking apparatus for signal integrator type locator systems.

Another object of the present invention is to provide angle tracking apparatus capable of operating at the extreme range of operation provided by signal integrator type locator systems.

Another object is to provide high speed sequential lobing in a signal integrator type locator system.

Other and further objects and features of the present invention will become apparent upon a careful consideration of the following detailed description when taken in conjunction with the accompanying drawings in which:

FIG. 1 shows a typical embodiment of the present invention, principally in block form.

FIG. 2 shows a representation of typical antenna beams employed in the apparatus of FIG. 1.

FIG. 3 shows a typical phase sensitive detector suitable for use in the apparatus of the present invention.

FIG. 4 shows several signal waveforms useful in explaining integrating signal storage and play back techniques.

FIG. 5 shows details of a typical signal storage tube.

FIG. 6 shows details of a sequencing switch employed in the apparatus of FIG. 1.

FIG. 7 shows details of an intermediate frequency switch employed in the apparatus of FIG. 1.

FIGS. 8-A, 8-B, 8-C show various antenna reflector and lens arrangements.

With particular reference now to FIG. 1 of the drawing, a typical embodiment of the features of the present invention is shown principally in block form. This apparatus includes a multiple element antenna system 10 having five principal antenna elements. The first element is a transmission element 10-A which is constructed to be highly directional in nature and disposed to deliver electrical energy in a narrow, substantially conical, beam along the indicated axis of directivity. For optimum results it is desirable that the antenna elements of the system 10 do not radiate directly but instead are placed at the focus of a parabolic reflector or a suitable lens structure. By such arrangements, the physical displacement of the elements of antenna 10 are minimized. It should be borne in mind that no such parabola or lens has been shown in FIG. 1, however the general arrangement where such may be used is shown in FIGS. 8-A, 8-B, 8-C. In any case, the reflector or lens structure would be mounted for simultaneous angular motion with the elements of antenna 10.

Four receiving antenna elements 10-B, 10-C, 10-D, 10-E are provided, each having a narrow conical beam which is displaced with respect to the axis of directivity by positioning the elements to obtain a slight divergence of the beam centers. The general orientation of the beams is indicated in FIG. 2 with conical portions for the various elements identified with numbers corresponding to the elemnts. The beam from the transmission element 10-A is shown as centrally disposed with the center of the beams of the receiving elements divergent from the transmitting beam center.

The entire antenna assembly is suitably journalled by means not shown for independent motion about two axes, firstly, an elevational axis, permitting operation for objects at various elevational angles, and secondly an azimuth axis, permitting operation for objects at various bearing angles.

For radar operation, the transmission antenna 10-A is supplied with short duration pulses of radio frequency energy generated by the pulse transmitter 11 under control of the modulator 12 as normally timed in duration by a timing unit 13. As in conventional radar operation, the normal time duration of the pulses is quite short relative to the time spacing therebetween.

Received signals intercepted by the antennas 10-B, 10-C, 10-D and 10-E are sequentially applied through a sequencing switch 14, later to be described, to a conventional mixer 15 to obtain an intermediate frequency signal for intermediate frequency amplification by wide-bandwidth intermediate frequency amplifier 16. Intermediate frequency amplifier 16 may be conventional in design and is equipped with band pass characteristics suitable to pass the frequencies normally encountered in present day radar systems. The sequencing switch 14 may be mechanical or electronic in nature as desired or a combination of both, the prime requirement being that it apply the signals from the receiving antennas 10-B, 10-C, 10-D and 10-E to mixer 15 in a selected repetitive sequence. Typically the sequence would be right, left, up, down with the sequence recurrence rate equal to one fourth the transmitter pulse recurrence frequency and with the change from one antenna to another taking place during each transmitter pulse.

The lengths of the signal paths from the receiving antennas 10-B, 10-C, 10-D, 10-E to the sequencing switch 14 are arranged so that received signals intercepted by all antennas in return from an object on the axis of directivity will experience equal time delay in the lines, arriving at the sequencing switch 14 at the same time and with identical phasing.

The locally generated signal with which the received signals are combined in mixer 15 to obtain the intermediate frequency output signal is preferably not obtained from an oscillator of the continuous free-running type as in ordinary receivers. For reasons which will be appreciated later, it is desirable to have some form of synchronization or phase coherence between the local oscillator and the pulse transmitter. An ideal arrangement for obtaining such a local signal is given in my copending application Serial No. 114,450, filed September 7, 1949, entitled "Radar System," however it is not essential that this particular apparatus be incorporated in the apparatus of the present invention. The advantages which accrue from the use of this radar system are so great however, that it has been included in the apparatus of FIG. 1.

Briefly described in one form, it employs an electronic signal storage tube of conventional design having bandwidth and frequency response characteristics suitable for reproducing the sinusoidal oscillations defining the transmitter pulse either at the frequency generated or at a frequency somewhat reduced therefrom. Each transmitter pulse may thus be stored on a sweep trace scanning the face of the storage tube and subsequently played back by a playback sweep timed to occur in coincidence with the receipt of return energy from a selected range and at a frequency suited to produce the intermediate frequency signal required for wide bandwidth intermediate frequency amplifier 16.

As shown in FIG. 1, the transmitter signal is stored on a time trace in the storage device 17 under the control of a record sweep circuit 18. The record sweep circuit is typically a saw-tooth sweep generator synchronized by connection to the timer 13 to start each record sweep in coincidence with the start of each pulse of energy produced by transmitter 11.

Playback of each stored transmitter signal is under the control of a playback sweep circuit 19. The playback sweep circuit 19 is again a saw-tooth sweep generator synchronized by connection to timer 13 but the connection is through range selector 20 which delays playback to produce each playback sweep in coincidence with the receipt of return energy from a distant reflective object at selected range. The variable delay action thus required of range selector 20 may be provided by numerous forms of delay circuits, perhaps the simplest of which would be a multivibrator type of delay gate generator in which one of the time constant elements is a variable resistor controlled by the handwheel 21. Indication of the range selected is provided by the range indicator 22 which can be operated by some form of electrical connection such as a selsyn system or may be simply mechanically linked to handwheel 21.

Playback signals obtained from signal storage device 17 possess substantially the same characteristics as the original radar transmitter pulses, that is, their duration, time spacing and frequency spectrum are the same, however they may exist at a lower frequency made so, if desired, through the operation of a mixer cooperative within the signal storage device 17. Consequently intermediate frequency signals from the wide band intermediate frequency amplifier 16 also possess the same amplitude modulation characteristics as the transmitter pulses however they will have no frequency modulation and will in general exist at a lower frequency and will be intermingled with noise generated in the preceding sections of the receiver system or picked up from outside sources.

To minimize the effects of the noise, the signal integrating principles taught in the first mentioned copending application can be used to permit response to return energy of very low levels. In this operation, short duration signals from the wide band intermediate frequency amplifier 16 are applied to a second signal storage tube 23 which may in general be similar to the first. Storage device 23 stores the intermediate frequency signal from amplifier 16 on a time trace produced by the sweep signal obtained from a record sweep circuit 24. The record sweep signal for signal storage device 23 actually occurs in time coincidence with the playback sweep signal for signal storage device 17 so the same sweep signal as provided by the playback sweep circuit 19 may be employed as the record signal for signal storage device 23 if desired. If such is the case, record sweep circuit 24 may be simply a suitable amplifier stage responsive to the signal from playback sweep circuit 19 to provide a record sweep for signal storage device 23.

The short duration, widely spaced signals recorded in storage device 23 as received are preferably played back immediately following their recording and in such a manner, typically at a reduced frequency, that the short duration signals are stretched to occupy substantially the entire time spacing between successive signals thereby providing a substantially continuous wave signal which can be handled by narrow bandwidth amplifier circuits.

The low velocity playback sweep signals for storage device 23 are provided by a playback sweep circuit 25. Where a single signal is stored and then "stretched" in time to occupy substantially the entire time interval between adjacent successive pulses, the recurrence frequency of the playback signal will be the same as that of the storage signal but differing in time rate of change. To insure recurrence frequency correspondence, the playback sweep circuit 25 is preferably synchronized by a signal obtained from the record sweep circuit 24 so that the playback operation is initiated immediately following the end of the recording operation.

The substantially continuous, low frequency, output signals obtained from signal storage device 23 are applied continuously to an intermediate frequency amplifier 26 which can have a very narrow bandwidth providing noise rejection to a high degree. Amplifier 26 is also of conventional design and in a typical case would have a bandwidth of only a few cycles per second, or even less than one cycle per second. Output signals from amplifier 26 are detected by a conventional detector 27, then again amplified by a "D.-C." amplifier 28 for presentation by signal indicator 29. Indicator 29 may be simply a meter, to indicate the presence or absence of a reflective object at the selected range in the direction of antenna orientation, or it may include one or several cathode ray tube indicators cooperative with the range signal received by range selector 20 to provide a range indication somewhat similar to the familiar "A" type signal presentation. Alternately the object presence indication, range indication and antenna orientation sensings may be combined to provide somewhat of a Plan-Position Indication (P.P.I.).

A close approximation to target direction can generally be obtained by moving the antenna in the two planes to obtain a maximum indication on indicator 29. The disadvantage is that even with the narrowest possible beam angles for antenna system 10, this maximum is very broad, too broad for effective fire control. Conventional lobed angle measuring systems cannot be used because of the integration technique.

To provide angular error sensing, the stretched playback I.F. signals as obtained from the signal storage device 23 are delivered through an intermediate frequency switch 30 to the independent azimuth and elevation intermediate frequency amplifiers 31, 32. Switch 30 is of a special nature suitable to perform the functions required and is discussed at greater length in conjunction with FIG. 7. For the present suffice it to say that switch 30 is preferably electronic in nature and is synchronized either by the pulse transmitter 11 or by the sequencing switch 14 whichever is the more convenient for obtaining the desired result. In the drawing the switch 30 is synchronized by the sequencing switch 14. The operation of switch 30 is such as to deliver the stored signals resultant to reception from the azimuth antennas 10-B and 10-C to the azimuth intermediate frequency amplifier 31 and the signals resultant to reception from the vertical antennas 10-D and 10-E to the elevation intermediate frequency amplifier 32. Additionally the operation of switch 30 is such as to reverse the polarity of the playback signals obtained from antenna 10-C with respect to those from antenna 10-B and also to reverse the polarity of playback signals from antenna 10-E with respect to those from antenna 10-D.

Intermediate frequency amplifiers 31 and 32 are amplifiers possessing narrow bandwidth, high "Q," characteristics suitable to receive excitation for short periods of time and continue oscillations at a selected frequency for a substantial period of time thereafter increasing oscillation upon occurrence of successive signals existing in phase. Typically amplifiers 26, 31 and 32 are operative at a center frequency of 1 kc. having a bandwith of 5 cycles per second.

With the signal opposition for opposing fields of reception for each coordinate, the intermediate frequency amplifiers 31 and 32 will not provide integration or signal "build-up" from successive pulses as is obtained in amplifier 26 because oscillations induced individually in each of the amplifiers 31 and 32 by signals from one zone of reception for each will be opposed by signals from the opposing zone for each. Rather, substantial signal cancellation will take place which will be complete whenever amplitude equality exists between the signals intercepted by the two opposing antennas for each coordinate. This type of null is extremely sharp and gives a highly accurate indication of object direction. Incomplete cancellation will occur whenever one of the opposing antennas receives a stronger signal than the other thereby exciting the narrow band circuit heavier in one direction than in the other. Such a resultant signal will be substantially in phase or in phase opposition with respect to the signal in the integrating intermediate frequency amplifier 26 depending upon whether the direct polarity or the reversed polarity signal for each coordinate is the greater in amplitude.

Sensing of the phase of resultant signals in the output of the azimuth and elevation intermediate frequency amplifiers is made by independent phase sensitive detectors 33 and 34 which not only provide customary detection action but also compare the phase of the resultant signals with signals of a reference phase taken from the output of the intermediate frequency amplifier 26.

A typical phase sensitive detector suitable for either 33 or 34 is shown in FIG. 3. This detector employs the rectification elements 125, 126 which are typically of the high vacuum or crystal type which are connected to receive push-pull signals through transformer 127 from either azimuth or elevation intermediate frequency amplifier 31 or 32 of FIG. 1. These tubes are also connected to receive push-push signals from the intermediate frequency amplifier 26 of FIG. 1 through transformer 128. Rectified output signals are filtered across the networks 129, 130, 131, 132 and appear at the output terminal 133 for delivery to the appropriate D.-C. amplifiers 35, 36 of FIG. 1.

Two detectors of FIG. 3 are employed in the apparatus of FIG. 1, both receiving the output from amplifier 26 and one receiving the output from amplifier 31 with the other receiving the output from amplifier 32. The potential at the detector output terminal 133 is zero whenever the output from the corresponding amplifier 31 or 32 is zero, however it will depart from zero becoming either positive or negative whenever there is output from the corresponding amplifier 31 or 32. The amount of departure is proportional to the amplitude of the signal from the amplifier 31 or 32 and the polarity is dependent upon the phase (either "in phase" or "out of phase") of the amplifier 31 or 32 signal with respect to the signal from amplifier 26.

Detector output signals thus derived are separately applied as just mentioned to D.-C. amplifiers 35, 36 and presented on azimuth and elevation error indicators 37, 38. As with indicator 29, these error indicators may be simple meters, and if such, are preferably of the zero center variety. By visual indication it is thus possible to determine to a high degree of accuracy whenever the antenna axis of directivity is positioned on an energy reflective object and to make necessary alterations in the antenna axis of directivity to maintain such a desired position despite relative angular motion of the distant object and the radar system location.

Additional equipment of entirely conventional nature may be employed where it is desired to have automatic follow-up of a moving target by the antenna axis of directivity to obtain rate information for gun fire control. The automatic follow-up apparatus operates independently for azimuth and elevation and is responsive to amplified signals from the amplifiers 35 and 36 which are applied to servo mechanisms 39, 40. Servo mechanisms 39, 40 transform electrical signals into mechanical motion driving the shafts 41, 42 reversibly to position through gear mechanisms 43, 44 the antenna axis of directivity to the right-left or up-down to hold it in line with the direction of an energy reflective object.

Indication of the actual orientation of the antenna axis of directivity is given by mechanical indicators 45, 46 which are suitably linked to the antenna drive apparatus.

The entire apparatus is thus basically described, however several points touched on only briefly in passing will now be described in additional detail.

The aspects of storage of short duration, widely spaced, repetitive pulse signals with playback in such a manner as to obtain a substantially continuous wave signal which can be handled by narrow bandwidth amplifier circuits can be explained with greater clarity with the aid of FIG. 4 which shows three similar sinusoidal oscillations, one above the other. These similar oscillations represent the carrier waves of three successive received pulse signals as stored on the signal storage device 23 but it should be borne in mind that although sinusoidal positional or amplitude variations are shown in FIG. 4, actual signal storage on tube 23 would generally take place as intensity or concentration variations of electrons in a substantially straight line on the tube. It should be further understood that in the simple storage scheme chosen for the previous discussion, the three signals shown in FIG. 4 would not be simultaneously existent one above the other but would be sequentially existent as on a single line.

In the playback operation, particular attention must be given to signal phasing for the signals to integrate or "build-up" in amplifier 26 from one pulse to the next. As a general rule, transmitter pulses reflected from constant range targets will all start with the same phasing. Ordinarily there is nothing to insure that the phase angle at the termination of each pulse and the time lapse at the end of the playback of each recorded pulse will be such as to make certain that the phase angle of the carrier wave of the integrated signal present in the narrow bandwidth intermediate frequency amplifier 26 from one signal will be in exact correspondence with carrier waves in a succedent signal when playback of the succedent signal is started.

Phase coherence between recorded signals on playback can be easily brought about by close control of the playback of the stored signals. This control involves the adjustment of the playback sweep length or duration so that it occupies a length on the face of the storage tube exactly equal to a multiple of the distance occupied by one cycle of the carrier wave of the stored signal and equal to a period of time differing from the duration of the stored received signal by a small amount, including zero.

In FIG. 4, the dotted vertical line 47 represents the starting point for all storage and playback sweeps. The vertical line 48 represents the end of stored pulse signals while the vertical line 49 indicates the end of playback sweeps. In storage, the first signal 50 represents a received signal returned by a distant object responsive to a first transmitter pulse, the signal 51 represents a received signal returned by a distant object responsive to a second transmitter pulse, and the signal 52 represents a received signal returned by a distant object responsive to a third transmitter pulse. All signals are shown identical which would ordinarily be the case for successive signals at a uniform object range. The signals start at the same phase (which may or may not be zero degrees as shown) and end at some random phase. The playback period is longer than the recorded signal duration by a small amount.

In playback therefore, the first stored signal 50 is scanned to deliver a signal to the narrow bandwidth intermediate frequency amplifier 26 in the interval of time the playback beam requires to travel from line 47 to line 48. When the playback beam reaches line 48 it does not flyback immediately but continues to travel from line 48 to line 49 and then rapidly returns to line 47 or experiences fly-back. In the time interval represented by the time required for the beam to move from line 48 to line 49 the absence of a recorded signal between lines 48 and 49 prevents the delivery of an output signal to the narrow bandwidth intermediate frequency amplifier 26. This signal absence has negligible effect on amplifier 26 because the tuned amplifier 26 being of narrow bandwidth and high Q has a natural tendency to "ring" thus continuing the signal in a sinusoidal manner as indicated by the dotted line portions of signals 50, 51 and 52 between the lines 48 and 49.

In the ordinary course of operation, the first stored signal 50 may be erased by the playback operation itself so that the second received signal 51 can then be stored in response to a second transmitter pulse. This signal can be stored in the interval of time represented by the spacing between lines 48 and 49 as shown or if this fraction of a carrier wave cycle is inadequate, the spacing between lines 48 and 49 may be lengthened to include some whole number of cycles of the carrier wave in addition to the fraction of a cycle as shown between lines 48 and 49 in FIG. 4. With the same phase angle existing at line 49 as at the initial line 47, in-phase addition of signals can occur.

A storage tube suitable for the apparatus of the present invention is shown in FIG. 5. This tube is described in a copending application in the name of A. V. Haeff, filed October 15, 1947, Serial No. 768,790, entitled "Method of Storing, Maintaining, and Reproducing Electrical Signals and Means Therefor," now U.S. Patent No. 2,813,998. Typically two such storage tubes of this general character would be employed in the apparatus of FIG. 1, one in the signal storage device 17 and one in the signal storage device 23. The tube has an insulator plate 53 with an active surface 54 placed thereon. Typically the plate may be of glass and the active surface distributed willemite particles.

An initial charge distribution pattern representative of the transmitter pulse may be placed on the active surface 54 by an electron gun including cathode 55. The beam of this gun may be controlled by grid 56 and the deflection means 57 under intensity control of signals supplied from signal source 58 and deflection signals from sweep circuit 58–A. Source 58, in the case of signal storage device 23 of FIG. 1 may correspond to wide bandwidth intermediate frequency amplifier 16. The beam is focused by a conventional lens electrode system shown diagrammatically at 59 for which a voltage supply 60 is provided. The main tube anode 61 coated on the interior of the envelope is also energized by supply 60.

Signals placed on the active surface 54 are maintained thereon for considerable periods of time if so desired by delivering low velocity electrons thereto from an electron gun assembly including the cathode 62 and focusing lens system 59–A.

Screen 63 possessing close spacing such as 200 mesh per inch collects secondary electrons emitted from the surface 54 upon bombardment by playback scanning electrons from a playback electron gun including cathode 64 and focusing lens system 59–B. This playback scan is controlled by the playback sweep circuit 65. Output signals produced from the secondary emission current to screen 63 are obtained at terminal 66 and represent, for example the output signals delivered from the storage device 23 of FIG. 1 to amplifier 26 and switch 30. Sweep circuit 58–A corresponds to the record sweep circuit 24 of FIG. 1 whereas sweep circuit 65 corresponds to the playback sweep circuit 25.

Erasure of the stored signals is accomplished by diminishing or terminating the holding beam from cathode 62 or if desired can be accomplished by appropriate changes in the potential of writing beam from cathode 55 itself, in a separate erase scan just prior to recording.

It is to be appreciated that this storage tube employs three separate electron tube devices. A gun with three such electron beam devices will be found advantageous in certain cases because it permits simultaneous recording and playback.

Where the operation is synchronized to such an extent that reading and writing never take place simultaneously, a single electron gun may be employed to perform in sequence the three operations of record, playback and erase permitting a much simpler tube structure to be employed than that shown in FIG. 5. Such a single beam tube may not of necessity require a "holding" beam of electrons but may sustain the stored signal by other means until it is "picked-up" in the playback operation.

It is thus seen that tremendous flexibility of operation and of selection of a storage device is available without exceeding the scope of the present invention.

FIG. 6 shows partly in schematic form details of components suitable for a sequencing switch 14. In this illustration a partly mechanical arrangement is shown for clarity, however in many instances a wholly mechanical or a wholly electronic system may have particular advantages depending upon carrier frequency and pulse repetition frequency employed. Also the system as shown includes waveguide elements whereas for certain frequencies other types of transmission line such as a coaxial or two wire system may have advantages.

The system as shown in FIG. 6 is built around a branched waveguide unit interposed between leads to the receiving antennas 10–B, 10–C, 10–D, 10–E and the lead to the mixer 15. The lengths of lines connecting the waveguide system are not extremely critical except that all connections to the receiving antennas should be exactly the same length. It goes without saying, however, that all lines should be as short as possible to reduce attenuation therein.

The branched waveguide has a main section 70 to which are series connected a plurality of branch lines, each including ionizable gas filled chamber window tubes 71, 72, 73, 74 which are placed a half wave-length from the junction of the individual branch with the main section. The ionizable tubes are essentially two conductor glow discharge units, such as the familiar Transmit-Receive switches employed in radar, placed across the waveguide in such a manner as to offer relatively little obstruction to the flow of electrical energy through the waveguide when not ionized and to provide substantially a short circuit when ionized. Ionization of the individual units is facilitated by applying a D.-C. potential to a third electrode in the assembly, commonly known as the "keep-alive" electrode. The "keep-alive" D.-C. potential is applied through series limiting resistors 75, 76, 77, 78 as controlled by a first mechanically driven switch section having the rotary contact 79 and four stationary contacts. Contact 79 is mechanically driven by a suitable motor not shown to sequentially remove the "keep-alive" potential from across the tubes 71, 72, 73, 74, effectively momentarily stopping the short circuit action thereof permitting transmission of received signals therethrough.

When the ionizable chambers are ionized, a half wavelength away at the junction of each branch with the main section 70, the branch is effectively short circuited. Thus only one branch is connected to the main section at any one instant. The junctions of the branch are placed a half-wavelength apart so that whenever both sections of a branch are shorted, they reflect an effective short at the next branch in the main line toward mixer 15.

Since the signal path from ionizable tubes 71 and 72 to the right end 80 of main line 70 is one wavelength longer than that from tube 74 and one half wavelength longer than that from tube 73, additional half wavelength sections of waveguide are interposed in the sections between tubes 73 and 74 and the connections to the antennas 10–D and 10–E so that the actual antenna leads may be the same length.

For the typical overall system herein exampled, it is desirable for each transmitter pulse to occur while the movable contact 79 is in a mid-position between two of the stationary contacts. There are several reasons for this. Since switching is necessary, if it occurs during the transmitter pulse a minimum of reception time is lost. Additionally, when the movable contact 79 is between two stationary contacts, all tubes 71, 72, 73, 74 are ionized, preventing delivery of any of the transmitter pulse energy to the mixer 15. Ionization characteristics of various types of tubes 71, etc. will, in general, determine the spacing between the stationary contacts. In some instances, it may even be desirable to provide an overlap between adjacent sections particularly where ionization is slow starting.

To provide the necessary synchronization between the generation of transmitter pulses and the operation of the movable switch contact 79, a second switch section is employed having the movable contact member 81 ganged to the movable contact 79. The movable contact 81 is connected to a positive voltage supply and in rotation momentarily connects a lead to timer 13 (FIG. 1) to this positive supply each time contact 79 reaches a space between the stationary contacts associated therewith. It is the series of positive pulses thus produced that operates timer 13 to key the transmitter 11. An additional switch section, ganged to the other two and having a movable contact 82 is provided to synchronize the operation of the intermediate frequency switch 30, details of which are shown in FIG. 7 to which reference is now made.

Switch 30 (FIG. 7) receives the output signals from signal storage device 23 at terminals 90, 91 of transformer 92. Transformer 92 has a center tapped secondary winding supplying equal amplitude, opposed polarity, signals at terminals 93, 94. Signals from terminal 93 are applied in parallel to the first grids 95, 96 of pentode type tubes 97, 98 and the opposing polarity signals from terminal 94 are applied to grids 99, 100 of tubes 101, 102. The anodes of tubes 97 and 101 are connected to the primary of an output transformer 103 and the anodes of tubes 98 and 102 to an output transformer 104. Anode circuit conductivity in the tubes 97, 98, 101, 102 is normally cut off by a negative biasing potential supplied to the suppressor grids of these tubes, however, the rotary contact 82 (FIG. 6) synchronized with contacts 79 and 81 sequentially grounds the suppressor grids for these tubes so that each is conductive approximately 25% of the time. Connections are typically made to the stationary contacts cooperative with contact 82 so that tube 97 will be conductive during reception from antenna 10–B, tube 101 conductive for antenna 10–C, tube 98 conductive for reception from antenna 10–D and tube 102 conductive for reception from antenna 10–E. It should be understood, however, that although a single line is shown in FIG. 1 connecting sequencing switch 14 and switch 30, actually four separate lines are included therein connecting to the grids 105, 107, 106, 108 of FIG. 7.

With these connections, signals are delivered as previously described, going to amplifier 31 in one polarity with reception from antenna 10–B, and in opposing polarity for reception from antenna 10–C, and going to amplifier 32 in one polarity for reception from antenna 10–D and in opposing polarity for reception with antenna 10–E.

As previously mentioned, the antenna system will in general be somewhat more complex than that shown in FIG. 1. To minimize phase shifts in received signals due to the physical displacement of the "horn" elements antenna 10, the horn elements will generally be placed as close together as possible and located on the focus of a parabolic reflector or a lens system.

An arrangement with a lens is shown in FIG. 8–A where the horn elements are represented by the numeral 10 as in FIG. 1 located on the focus of the lens. The lens which is generally composed of a series of thin, narrow parallel strips of metal arranged so as to form a circular or rectangular assembly with a cross section roughly as indicated by the center section 110 of FIG. 8-A. The serrated edge presents substantially a series of concentric circular segments of a wave guide lens, however the outer portions have been cut back to reduce the thickness while retaining the curvature.

In FIGS. 8-B and 8-C the lens is replaced by a parabolic reflector 111. In either case the horn elements are substantially on the parabola focal point, however, in FIG. 8-C only a portion of a parabola is used to minimize the effect of the horns on the passage of reflected energy from the parabola.

In all FIGS. 8-A, 8-B, and 8-C, three antenna field patterns are indicated generally to represent the response patterns of the various elements in one plane. Typically the center patterns 112 indicate the transmitter pattern while the pattern 113 is up and pattern 111 down.

Although certain specific embodiments of this invention have been disclosed and described it is to be understood that they are merely illustrative of this invention and modifications may, of course, be made without departing from the spirit and scope of the invention as defined in the appended claims.

What is claimed is:

1. In an echo energy operative detection device having divergent, partly overlapping zones of reception, means alternately storing in carrier waves the signals received from said divergent, partly overlapping zones of reception during successive short duration widely separated time intervals, playback means reproducing the stored signals during substantially the entire time spacing between the successive short duration time intervals, a narrow bandwidth carrier wave signal integrating circuit, and signal delivery means applying the reproduced signal from the playback means to the integrating circuit in one polarity for one zone of reception and in opposing polarity for the opposing zone of reception.

2. A pulse echo system comprising, transmitter means emitting short duration pulses of energy at successive widely-spaced instants of time, means receiving pulse echo signals returned by distant objects in separate, partly overlapping divergent fields, means storing received signals from the fields in carrier waves in a repetitive sequence, playback means reproducing short duration repetitive stored signals with short time spacing therebetween, a tuned, narrow bandwidth signal integrator operative at the carrier frequency responsive to provide signal buildup when successive input signals are additive, primary signal delivery means operative to deliver playback signals to the signal integrator in one polarity for one field, secondary signal delivery means operative to deliver playback signals to the signal integrator in opposing polarity for the opposing field, and means indicating the characteristics of resultant signals from the signal integrator.

3. A pulse echo system comprising, transmitter means emitting short duration pulses of energy at successive widely spaced instants of time, means receiving pulse echo signals returned by distant objects in separate, partly overlapping divergent fields, means storing received signals from the fields in carrier waves in a repetitive sequence, playback means reproducing short duration repetitive stored signals with short time spacing therebetween, first and second tuned, narrow bandwidth signal integrators operative at the carrier frequency responsive to provide signal build-up when successive input signals to each are additive, first signal delivery means operative to deliver playback signals to the first signal integrator in one polarity for one field, second signal delivery means operative to deliver playback signals to the first signal integrator in opposing polarity for the opposing fields, third signal delivery means operative to deliver all playback signals to the second integrator in similar phase, and a phase sensitive detector for comparing signals in the first and second integrators to determine the amplitude and polarity of signals in the first integrator.

4. A pulse echo system comprising, transmitter means emitting short duration pulses of energy at successive widely spaced instants of time, a receiving antenna system operative to receive return energy from distant objects in four divergent partly overlapping fields symmetrically divergent about a center of reception, means storing received signals from the fields in a repetitive sequence, playback means reproducing the stored short duration signals during substantially the entire time spacing between successive pulses, first, second and third oscillatory signal integrators operative to sustain in sinusoidal oscillations intermittent oscillatory signals applied thereto, first and second signal delivery means connected to the output of the playback means and to the first and second integrators operative to deliver signals from two opposing receiving fields in opposing phase to one integrator and from the remaining two opposing receiving fields in opposing phase to a second integrator, a third signal delivery means connected to the output of the playback means and to the third integrator operative to deliver signals from all zones of reception to the third integrator in phase coherence, and first and second phase comparison means connected to the output of the first and second integrators respectively and to the third integrator operative to separately produce output signals in amplitude proportional to the amplitude of the signals in the first and second integrators and polarity dependent upon the polarity of the signals relative to the signals in the third integrator.

5. A pulse echo system comprising, transmitter means emitting short duration pulses of energy at successive widely spaced instants of time, a receiving antenna system operative to receive return energy from distant objects in four divergent partly overlapping fields symmetrically divergent about a center of reception, means storing received signals from the fields in a repetitive sequence, playback means reproducing the stored short duration signals during substantially the entire time spacing between successive pulses, first, second and third oscillatory signal integrators operative to sustain in sinusoidal oscillations intermittant oscillatory signals applied thereto, first and second signal delivery means connected to the output of the playback means and to the first and second integrators operative to deliver signals from two opposing receiving fields in opposing phase to one integrator and from the remaining two opposing receiving fields in opposing phase to a second integrator, a third signal delivery means connected to the output of the playback means and to the third integrator operative to deliver signals from all zones of reception to the third integrator in phase coherence, first and second phase comparison means connected to the output of the first and second integrators respectively and to the third integrator operative to separately produce output signals in amplitude proportional to the amplitude of the signals in the first and second integrators and polarity dependent upon the polarity of the signals relative to the signals in the third integrator, and means responsive to output signals operative to position the antenna center of reception on a source of return energy to maintain minimum output signal amplitude.

6. In a pulse echo object detection system including a transmitter for periodically emitting short duration pulses of energy and a directional receiver for receiving echoes of said pulses in opposing, divergently overlapping fields of reception, a signal storage device for storing, in carrier wave form, echo signals returned from a selected object, means for periodically rendering said signal storage device operative to store the echo signals received by the individual fields of reception in sequence, signal playback means for reproducing the stored signals in carrier wave form during the interval between successive signal storage periods, a narrow bandwidth signal integrator means operative at the carrier wave frequency of the reproduced signals to provide signal build up when successive input signals applied thereto are in phase addition, signal delivery means coupling the reproduced signals to the input of the signal integrator and operative to deliver reproduced signals to the signal integrator in one phase for one field of reception and reproduced signals of an opposing phase for the opposing field of reception, and utilization means coupled to the output of said signal integrator means for utilizing the resultant output signal therefrom.

7. In a pulse echo object detection system including a transmitter for periodically emitting short duration pulses of energy and a directional receiver for receiving echoes of said pulses in opposing, divergently overlapping fields of reception, a cathode ray tube storage device operative to sequentially store, in carrier wave form, echo signals received by the individual fields of reception, means for rendering said storage device operative following each transmitted pulse for a period substantially equal to the duration of the transmitted pulse and at a time selectably delayed therefrom, signal playback means for reproducing the stored signals in carrier wave form during the interval between successive signal storage periods, a narrow bandwidth signal integrator means operative at the carrier wave frequency of the reproduced signals to provide signal build up when successive input signals applied thereto are in phase addition, signal delivery means coupling the reproduced signals to the input of the signal integrator and operative to deliver reproduced signals to the signal integrator in one phase for one field of reception and reproduced signals of an opposing phase for the opposing field of reception, and utilization means coupled to the output of said signal integrator means for utilizing the resultant output signal therefrom.

8. In a pulse echo object detection system including a transmitter for periodically emitting short duration pulses of energy and a directional receiver for receiving echoes of said pulses in opposing, divergently overlapping fields of reception, a signal storage device for storing, in carrier wave form, echo signals returned from a selected object, means for periodically rendering said signal storage device operative to store the echo signals received by the individual fields of reception in sequence, signal playback means for reproducing the stored signals in carrier wave form during the interval between successive signal storage periods, a first narrow bandwidth signal integrator coupled to the output of said storage device and operative at the carrier wave frequency of the reproduced signals to provide signal build up when successive input signals applied thereto are in phase addition, a second narrow bandwidth signal integrator means operative at the carrier wave frequency of the reproduced signals to provide signal build up when successive input signals applied thereto are in phase addition, signal delivery means coupling the reproduced signals to the input of the second signal integrator and operative to deliver reproduced signals to said second signal integrator in one phase for one field of reception and reproduced signals of an opposing phase for the opposing field of reception, and a phase comparison means for comparing the phase of the output signals from the first and second signal integrators.

References Cited by the Examiner

UNITED STATES PATENTS

| 2,312,761 | 3/1943 | Hershberger | 343—10 |
| 2,464,258 | 3/1949 | Pritchard | 343—7.3 |
| 2,491,450 | 12/1949 | Holmes | 343—8 |
| 2,523,283 | 9/1950 | Dickson | 343—9.5 |

CHESTER L. JUSTUS, *Primary Examiner.*

SIMON YAFFEE, NORMAN H. EVANS, *Examiners.*

W. W. BURNS, M. A. MORRISON, T. H. TUBBESING,
*Assistant Examiners.*